United States Patent

Bond

[11] Patent Number: 4,630,157
[45] Date of Patent: Dec. 16, 1986

[54] CLEANING DISKETTE FOR FLEXIBLE DISK DRIVE TRANSDUCERS

[75] Inventor: Howard T. Bond, Santa Clara, Calif.
[73] Assignee: Garlic Technologies, Inc., Morgan Hill, Calif.
[21] Appl. No.: 578,347
[22] Filed: Feb. 9, 1984
[51] Int. Cl.[4] .......................... G11B 5/41; G11B 23/03
[52] U.S. Cl. ...................................... 360/128; 360/133
[58] Field of Search ................. 360/128, 133, 135, 137

[56] References Cited

U.S. PATENT DOCUMENTS

| | | | |
|---|---|---|---|
| 4,374,404 | 2/1983 | Davis | 360/128 |
| 4,375,658 | 3/1983 | Martinelli | 360/128 |
| 4,377,831 | 3/1983 | Davis et al. | 360/128 |
| 4,503,473 | 3/1985 | Eyler et al. | 360/128 |

FOREIGN PATENT DOCUMENTS 2091472  7/1982  United Kingdom ................ 360/128

*Primary Examiner*—A. J. Heinz
*Assistant Examiner*—Benjamin E. Urcia

[57] ABSTRACT

A flexible cleaning disk for universal application in single sided and double sided flexible disk drives has a jacket, a flexible cleaning medium rotatably positioned within the jacket and a removable protective membrane arranged to normally cover one of the jacket access apertures. The protective membrane is a relatively thin flexible member fabricated from 0.002 inch polyester having a main body portion positioned within the interior of the jacket between the cleaning medium and the access aperture and a tab portion extending laterally from the main body portion and adhered to the outer surface of the jacket adjacent the access aperture. The relatively thin flexible membrane provides a highly efficient transfer medium for the compressive force applied by the pressure pad assembly in a single sided drive and the movable transducer assembly in a double sided drive to the cleaning medium. When used in a double sided drive, the membrane is removed during a second cleaning phase by releasing the tab portion from the jacket surface and withdrawing the main body portion from the access aperture.

4 Claims, 5 Drawing Figures

CLEANING DISKETTE FOR FLEXIBLE DISK DRIVE TRANSDUCERS

BACKGROUND OF THE INVENTION

This invention relates to flexible disk drives of the type designed for use with flexible or floppy disks. More particularly, this invention relates to cleaning diskettes for use in cleaning the transducer or transducers installed in such drives.

Flexible disk drives currently are employed in a wide variety of data processing systems as a mechanism for data storage and retrieval. Such drives are designed for use with flexible or floppy disks comprising a flexible polyester substrate with a recording layer deposited on each side, the compound substrate being rotatably enclosed in a protective jacket or envelope. The jacket is provided with an elongated access aperture on each side in order to afford access to an annular band of each recording layer when the flexible disk assembly is inserted into the disk drive.

Flexible disk drives are generally one of two types: single sided or double sided. A single sided flexible disk drive has a single read/write transducer affixed to a rigid arm and a retractable load pad assembly arranged in spaced alignment from the transducer in such a manner that the load pad presses the flexible disk within the jacket against the magnetic transducer during read and write operations. More specifically, the load pad is located within the disk drive assembly in a position in registration with one of the elongated access apertures in the flexible disk jacket so that the load pad may contact the recording media within the disk during a read or write operation. In order to provide easy insertion and removal of the flexible disk from the disk drive, some type of suitable mechanical retracting apparatus is provided for operating the load pad assembly into and out of pressure contact with the flexible disk recording media. A double sided disk drive employs a pair of read/write transducers, a first transducer located on a rigid arm and a second transducer located in a position similar to that of the load pad assembly of a single sided drive. In a manner similar to that employed for the single sided drive load pad assembly, the second transducer is typically provided with a suitable retracting mechanism to enable the second transducer to be placed in pressure contact with the recording medium through the appropriate access aperture during a read or write operation and to enable the flexible disk to be inserted and removed without interference otherwise.

In both types of flexible disk drive, it is necessary to periodically clean the read/write transducers in order to remove accumulated debris from the transducer surface, which debris builds up over use time. Failure to periodically clean the transducer surface results in deteriorated performance of the transducers, with a resulting loss in accuracy in recording and reproducing the digital information carried by the flexible disk recording surfaces. While the transducer may be cleaned manually, it has been found more convenient to provide a specially designed cleaning disk constructed with the same geometry as an ordinary flexible recording disk, but with an annular cleaning element in place of the normal annular recording element. Although two different types of cleaning disks may be constructed: one for a single sided drive and one for a double sided drive, it is preferable to have a universal cleaning disk suitable for use with either type of drive. Due to the different configurations of single sided drives and double sided drives, the cleaning disk requirements are different for each type of drive. For a single sided drive, the cleaning disk should be designed in order to avoid contact through the access aperture between the load pad assembly and the rotating cleaning material within the disk jacket (in order to avoid degradation of the load pad) while at the same time affording intimate contact between the cleaning disk and the transducer. In a double sided drive, on the other hand, the rotating cleaning material should be accessible to both the fixed transducer and the movable transducer so that each transducer surface is swept by the rotating cleaning disk.

In one type of flexible cleaning disk designed for universal use with both single and double sided drives, one of the jacket access apertures is provided with a removable tab portion formed by stamping perforations into the jacket material. In use with a single sided drive, this type of cleaning disk is inserted into the drive with the tab portion in place so that the load pad bears against the tab portion of the jacket to ideally press the underlying rotating cleaning medium against the fixed transducer; while the tab portion is removed to expose the cleaning medium through the access aperture when used with a double sided drive. While somewhat effective when used in a double sided drive with the tab portion removed, this type of cleaning disk suffers from the disadvantage that the tab portion, being formed from the same material as the disk jacket, is relatively stiff and noncompliant: consequently, the loading force afforded by the load pad assembly is not sufficient to guarantee intimate contact between the cleaning medium and the surface of the oppositely disposed fixed transducer. As a result, the cleaning effect is less than optimal.

In another type of commercially available flexible cleaning disk, a removable polyester tab is placed over one of the jacket access apertures. In use with a single sided drive, the tab is left in place so that the load pad bears against the outer surface of the tab; while when used with a double sided drive, the tab is removed to expose the cleaning medium to the movable transducer. This type of cleaning disk suffers from the disadvantage when used in a single sided drive that the pressure load provided by the load pad is distributed over the entire tab surface, due to the relative thickness of the tab (approximately 0.020 inches): consequently, optimal contact is not achieved between the cleaning medium and the surface of the fixed transducer.

SUMMARY OF THE INVENTION

The invention comprises an improved flexible cleaning disk which is relatively inexpensive to manufacture and which affords optimum contact between the cleaning medium and the single transducer in a single sided drive and both transducers in a double sided drive.

In its most general aspect, the invention comprises a flexible cleaning disk for use in cleaning the transducers in a single sided flexible disk drive and double sided flexible disk drive, the cleaning disk including a jacket, a flexible cleaning medium and a removable protective membrane. The jacket is provided with a central drive aperture and at least one access aperture in each of the major jacket surfaces for enabling the cleaning medium in the interior of the jacket to be exposed on each side of the jacket. The flexible cleaning medium is an annular disk fabricated from a suitable flexible cleaning material rotatably positioned within the jacket.

The removable protective membrane comprises a thin flexible sheet having a main body portion with an elongated oval shape and a tab portion extending laterally from the main body portion. The main body portion has length and width dimensions greater than the length and width dimensions of one of the elongated access apertures formed in the disk jacket so that the main body portion covers the access aperture when positioned within the interior of the jacket between the cleaning medium and the access aperture. The tab portion has a length dimension measured along the length dimension of the main body portion which is less than the length of the elongated access aperture, so that the tab portion extends through the elongated access aperture to the exterior of the disk jacket. Either the underlying surface of the tab portion or the adjacent surface of the flexible disk jacket is provided with a suitable adhesive, preferably in the form of a strip, to enable the tab portion to be removably adhered to the jacket surface in the region adjacent the normally covered elongated access aperture. The membrane is preferably fabricated from a polyester material with an optimum thickness of about 0.002 inch in order to provide sufficient flexibility when the cleaning disk is used in a single sided drive.

When used with a single sided drive, the protective membrane is left in place so that the disk drive load pad bears against the outer surface of the membrane when the disk is loaded into the drive. Due to the thinness and flexibility of the membrane, the load pad applies a compressive force through the membrane to the rotating cleaning medium to force the other side of the cleaning medium against the fixed transducer. When used in a double sided drive, the membrane is initially left in place during a first cleaning phase during which the transducer mounted on the rigid arm is swept by the rotating cleaning medium. During this first cleaning phase, the movable transducer functions in a manner similar to the load pad in the single sided drive to apply a compressive force through the membrane to the rotating cleaning medium to enhance the cleaning action. After termination of the first cleaning phase, the cleaning disk assembly is removed from the drive and the membrane is removed by releasing the tab portion from the disk jacket and pulling the membrane out of the interior of the disk jacket. After the membrane has been removed, the cleaning disk is inserted back into the drive unit for a second cleaning phase during which the movable transducer is cleaned by the action of the rotating cleaning medium. In all uses of the invention, the cleaning action is preferably enhanced by applying a cleaning solution to the cleaning medium prior to insertion of the cleaning disk assembly into the drive, whether single or double sided.

The invention affords the advantage of superior transfer of compressive force from the load pad to the rotating cleaning medium when the invention is used with either a single sided or a double sided drive, so that optimal contact and cleaning is achieved with all transducer surfaces. For a fuller understanding of the nature and advantages of the invention, reference should be had to the ensuing detailed description taken in conjunction with the accompanying drawings.

DESCRIPTION OF THE PREFERRED EMBODIMENTS

Figure 1:
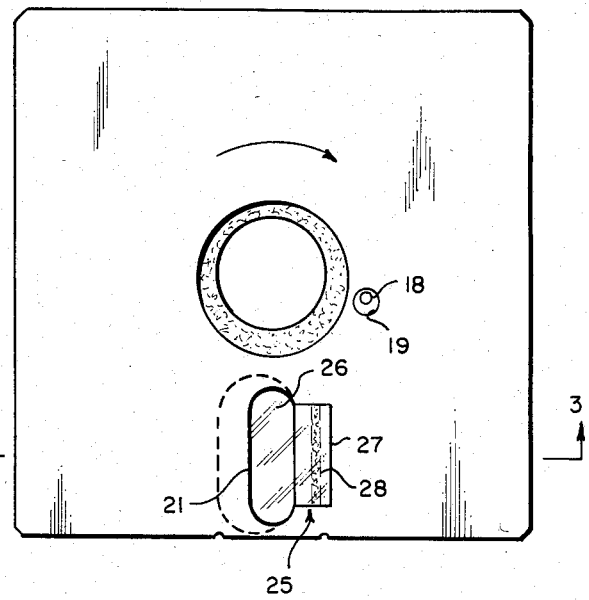
FIG. 1 is a plan view of one side of a flexible cleaning disk assembly incorporating the invention.

Turning now to the drawings, FIG. 1 illustrates one side of a preferred embodiment of the invention in plan view. As seen in this FIG., a flexible cleaning disk assembly generally designated by reference numeral 10 includes an outer jacket 11 having two major sides 12, 13 (see FIG. 2) with a concentric central drive aperture 15. Positioned within the interior of jacket 11 is a flexible cleaning disk 16 fabricated from any suitable cleaning material such as spun bound polyester sold under the trademark Reemay by Dupont Company. The cleaning disk 16 has a central aperture 17 dimensioned to be received by the drive spindle of an associated flexible disk drive (not shown) and an index hole 18 positioned to register once per revolution with a larger aperture 19 formed in side 12 of jacket 11 and concentric larger aperture 20 formed in side 13 of jacket 11.

Jacket 11 is provided with an access aperture 21 formed in side 12 having an elongated oval configuration for the purpose of exposing an annular band of the cleaning disk 16 to access in the manner described below.

Figure 2:
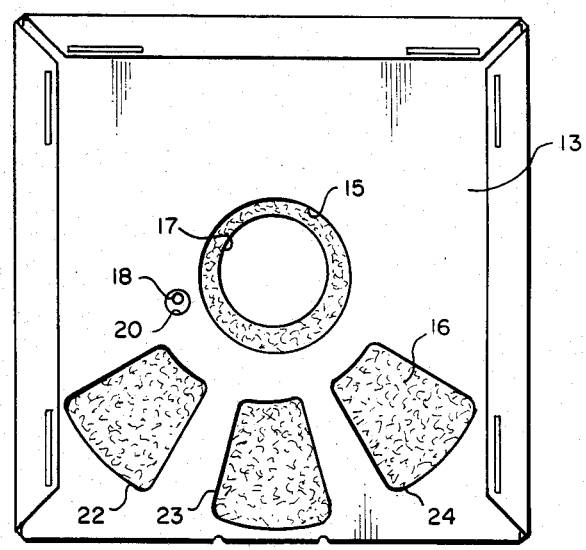
FIG. 2 is a plan view of the other side of the disk assembly of FIG. 1.

With reference to FIG. 2, which shows the reverse side of the preferred embodiment of the invention, three segmented access apertures 22–24 are formed in side 13 of jacket 11. Apertures 22–24 are provided to facilitate access to the material of cleaning disk 16 for the purpose of enabling a suitable cleaning solution to be applied to the cleaning disk material as described below.

Figure 3:
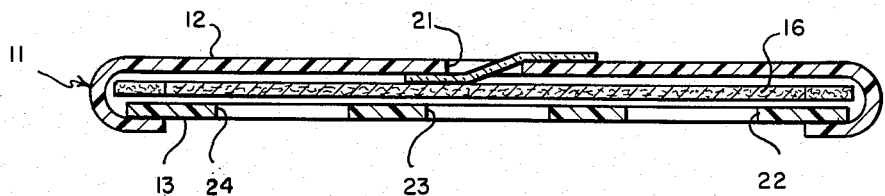
FIG. 3 is an enlarged sectional view taken along lines 3—3 of FIG. 1.

In the configuration illustrated in FIGS. 1–3, which is the point of sale configuration, a removable flexible membrane generally designated by reference numeral 25 is included with the flexible cleaning disk 10. Membrane 25 has a main body portion 26 illustrated in broken lines in FIG. 1 which is generally elongate with oval ends and having larger length and width dimensions than the comparable dimensions of access aperture 21; as well as an integrally formed tab portion 27, which is generally rectangular in outline and has a length dimension (as measured along the length dimension of the main body portion) which is smaller than the length dimension of the access aperture 21. Tab portion 27 is removably adhered to the outer surface of side 12 of the flexible cleaning disk by means of an adhesive strip 28 indicated by the broken lines in FIG. 1. This adhesive strip may be formed either on the outer surface of side 12 of jacket 11 or on the under surface of tab portion 27, as desired. Preferably, the adhesive strip 28 is formed using acrylic adhesive in a hot melt process applied to the under surface of tab portion 27.

Membrane 25 is formed from a relatively thin flexible sheet of material, preferably 0.002 inch polyester sheet material, by any suitable means, such as die cutting, stamping or the like. The term "relatively thin" is intended to mean a thickness which permits a compressive force applied to the exposed portion of the main body portion 26 of membrane 25 by a load pad assembly or a retractable transducer (as described below) to be effectively transmitted to the underlying cleaning material of disk 16 so that the bottom surface of the cleaning material of disk 16 (as viewed in FIG. 3) is pressed against the surface of a magnetic transducer to wipe the surface of the transducer clean of accumulated debris. For purpose of dimensional comparison, the typical jacket wall thickness is 0.010 in. and the thickness of cleaning material 16 is about 0.012 in.

The flexible cleaning disk 10 is assembled by first arranging the cleaning disk 16 within the interior of the jacket 11 using conventional techniques. Thereafter, the membrane 25 is attached to the cleaning disk assembly 10 by maneuvering the main body portion 26 through the access aperture 21 so that the main body portion 26 covers the access aperture 21 in the manner indicated in FIGS. 1 and 3, after which the tab portion 27 is adhered to the surface of side 12 by means of adhesive strip 28. Alternatively, membrane 25 may be first arranged in the attitude illustrated in FIGS. 1 and 3 with the tab portion 27 adhered to the outer surface of side 12, after which the cleaning disk 16 may be inserted into the jacket and the jacket may then be sealed.

Figure 4:
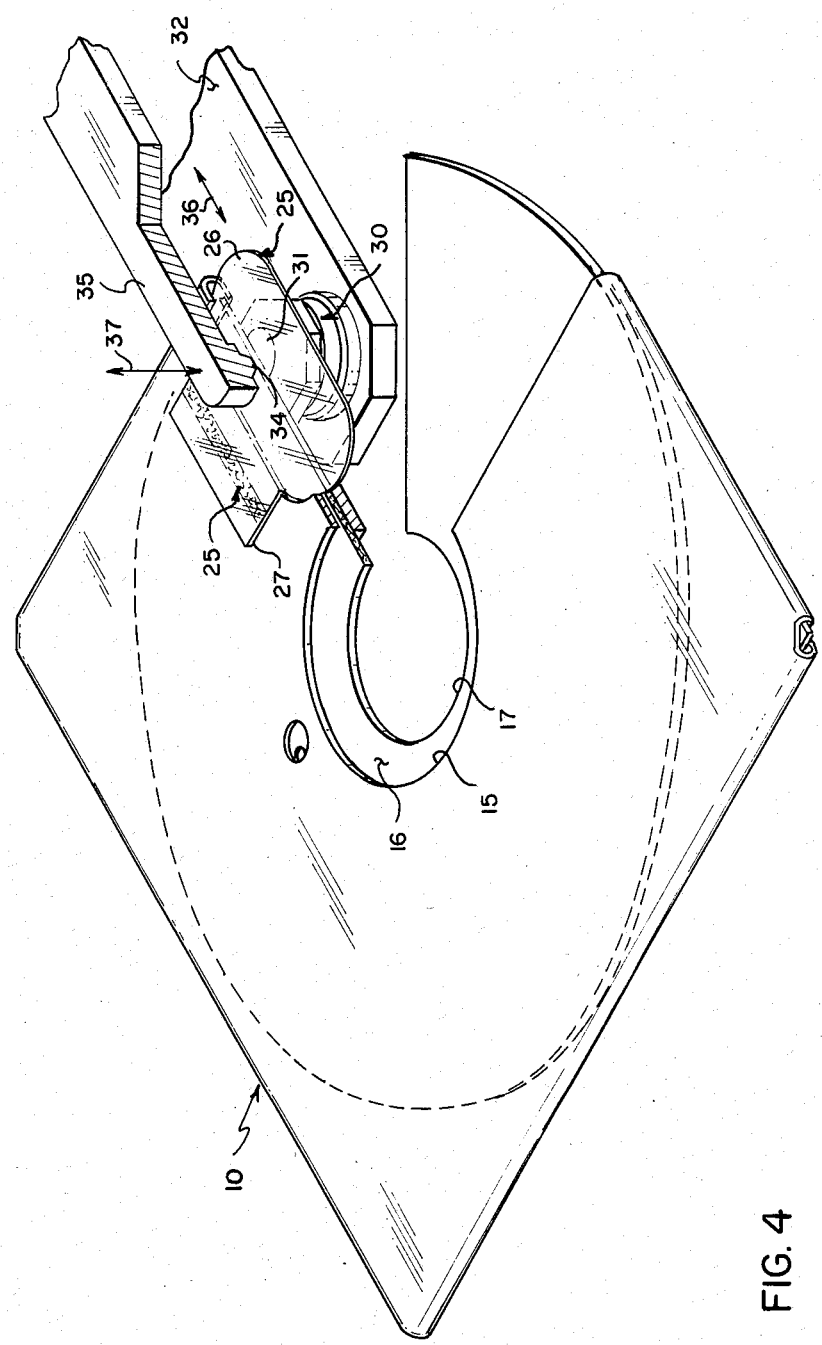
FIG. 4 is a schematic perspective view partially cut away illustrating use of the invention with a single sided drive.

FIG. 4 illustrates use of the invention with a single sided drive. For simplicity, only the extremities of the transducer and the load pad assembly are illustrated in this FIG. As shown in FIG. 4, a magnetic transducer 30 of the "button" type is rigidly attached to a radially translatable mounting arm 32. A pressure pad 34 is attached to the operating end of a retractable arm 35, shown partially in section, arranged for radial motion along the opposite directions of arrow 36 in unison with transducer arm 32. Pressure pad arm 35 is coupled to a conventional operating mechanism (not illustrated) which provides an actuating force for advancing or retracting the pressure pad 34 towards and away from the surface 31 of transducer 30 in the directions indicated by arrow 37.

In use, after insertion of the flexible cleaning disk assembly 10 into the disk drive, arm 35 is advanced in the downward direction of arrow 37 to apply pressure to the main body portion 26 of membrane 25. Due to the thinness and flexibility of main body portion 26 of membrane 25, this pressure is transmitted locally through the main body portion underlying the pressure pad 34 to the cleaning material 16 passing directly underneath the pad 34 as the cleaning material 16 is rotated by the associated disk drive spindle (not illustrated). As a consequence, the cleaning material 16 is firmly pressed against the surface 31 of transducer 30 to provide a wiping action to this surface 31. After the cleaning period has elapsed, the cleaning disk assembly 10 may be withdrawn, which is accomplished by retracting arm 35 by means of the conventional disk drive actuating mechanism and manual withdrawal of the cleaning disk assembly 10 from the disk drive.

Figure 5:
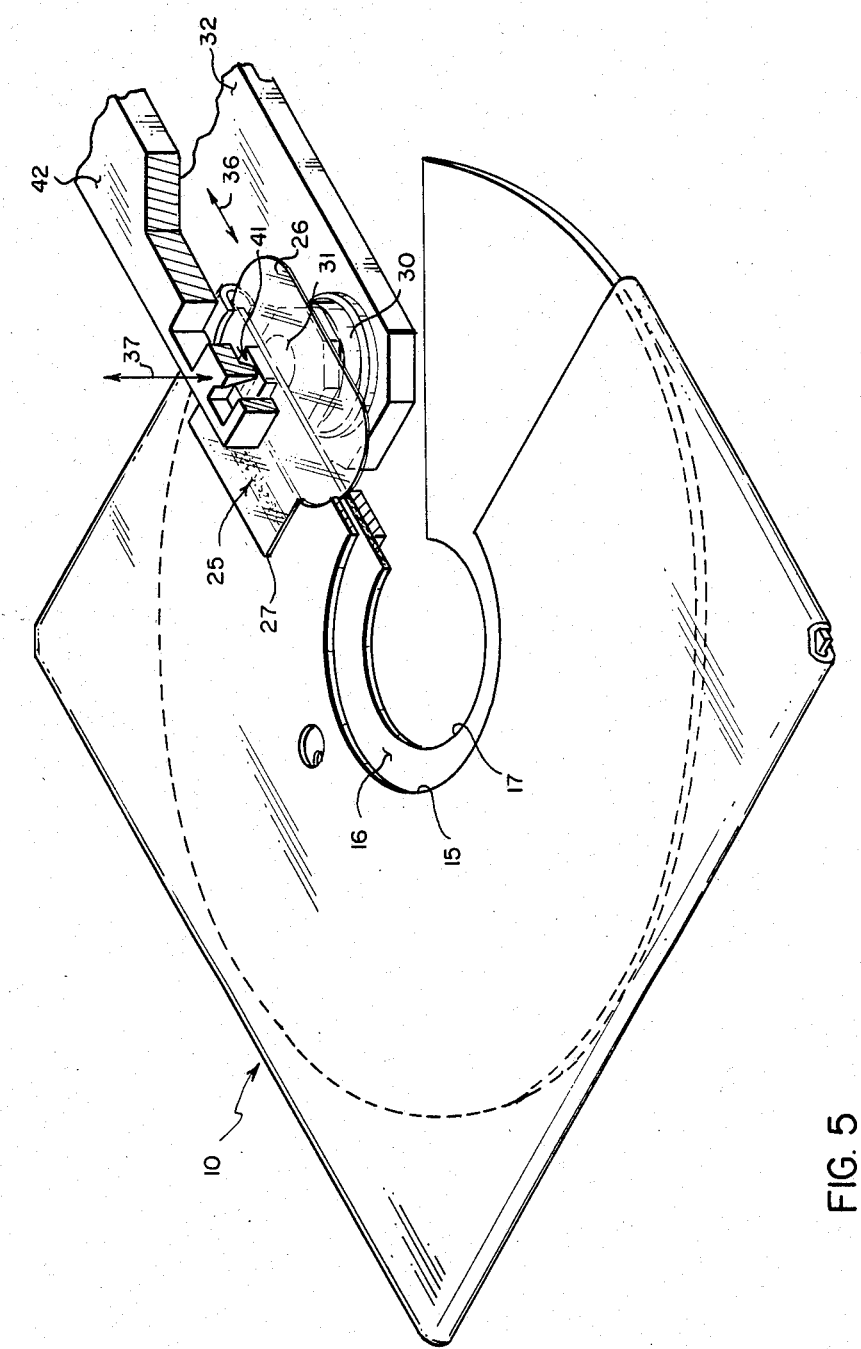
FIG. 5 is a schematic perspective view partially cut away illustrating use of the invention with a double sided drive during the first cleaning phase.

FIG. 5 illustrates use of the flexible cleaning disk assembly 10 during a first cleaning phase in connection with a double sided drive. As seen in this FIG., in the double sided drive the pressure pad 34 and pad arm 35 are effectively replaced by a second retractable read/write transducer 41 and a transducer control arm 42 which is radially translatable in unison with arm 32 along the opposite directions depicted by arrow 36. In addition, transducer arm 42 is coupled to a conventional operating mechanism (not illustrated) which provides an actuating force for advancing or retracting the transducer 41 towards and away from the surface 31 of transducer 30 in the directions indicated by the double headed arrow designated with reference numeral 37.

In use, after insertion of the flexible cleaning disk assembly 10 into the disk drive, arm 42 is advanced in the downward direction of arrow 37 to apply pressure through transducer 41 to the main body portion 26 of membrane 25. In a manner similar to that noted above with respect to the single sided drive operation, in the double sided drive first cleaning phase this pressure is transmitted locally through the main body portion underlying the transducer 41 to the cleaning material 16 passing directly underneath the transdcuer 41 as the cleaning material 16 is rotated by the associated disk drive spindle. As a consequence, the cleaning material 16 is firmly pressed against the surface 31 of transducer 30 to provide a wiping action to this surface 31. After this first cleaning phase, the cleaning disk assembly 10 is withdrawn, the membrane 25 is manually removed, and the cleaning disk assembly is re-inserted into the disk drive to initiate the second cleaning phase. During this second cleaning phase, the surface of transducer 41 is cleaned by the wiping action of cleaning material 16, which sweeps the surface of transducer 41. The cleaning operation is terminated by withdrawing the cleaning disk assembly 10 from the drive.

During use of the invention with either single sided or double sided drives, the cleaning operation can be enhanced by wetting the cleaning disk material 16 with a suitable cleaning solution, such as a solution of alcohol and Freon TF from a metered spray bottle. Other suitable cleaning solutions will occur to those skilled in the art.

As will now be apparent, flexible cleaning disk assemblies fabricated according to the teachings of the invention are suitable for use with both single sided drives having only one transducer as well as double sided drives having two transducers. Further, the use of the relatively thin flexible membrane affords a highly effective compliant medium for enabling the transfer of pressure from the pressure pad 34 of a single sided drive, or the movable transducer 41 of a double sided drive, to the cleaning medium 16. Moreover, the membrane 25 is relatively easy to install in the cleaning disk jacket between the outer jacket wall and the inner cleaning medium, and can be easily removed for use with double sided drives.

While the above provides a full and complete disclosure of the invention, various modifications, alternate constructions and equivalents may be employed without departing from the true spirit and scope of the invention. Therefore, the above description and illustrations should not be construed as limiting the scope of the invention, which is defined by the appended claims.

What is claimed is:

1. A flexible cleaning disk for use in cleaning the transducers in a single sided flexible disk drive and a double sided flexible disk drive, said cleaning disk comprising:

a jacket having a central drive aperture and a pair of interior access apertures;

a flexible cleaning medium rotatably positioned within said jacket; and a removable protective membrane having a tab portion adhered to the outer surface of said jacket adjacent one of said access apertures and a main body portion positioned within, but not secured to, the interior of said jacket between said cleaning medium and said one of said access apertures to normally cover said one of said apertures, said membrane having a thickness substantially less than the thickness of the material which forms said jacket.

2. The invention of claim 1 wherein said membrane has a thickness of substantially 0.002 inch.

3. The invention of claim 1 wherein said membrane is fabricated from 0.002 inch thick polyester.

4. The invention of claim 1 wherein the main body portion of said membrane has an elongated oval configuration of greater length and width than said at least one of said access apertures.

* * * * *